(12) United States Patent
Brennan (10) Patent No.: US 9,200,771 B2
(45) Date of Patent: Dec. 1, 2015

(54) DOOR HANDLE NIGHT-LIGHT

(71) Applicant: 3D Lighting Innovations Inc., Mississauga (CA)

(72) Inventor: Erick Brennan, Sun Valley, CA (US)

(*) Notice: Subject to any disclaimer, the term of this patent is extended or adjusted under 35 U.S.C. 154(b) by 106 days.

(21) Appl. No.: 14/178,427

(22) Filed: Feb. 12, 2014

(65) Prior Publication Data

US 2014/0226318 A1    Aug. 14, 2014

Related U.S. Application Data

(60) Provisional application No. 61/858,094, filed on Jul. 24, 2013, provisional application No. 61/764,291, filed on Feb. 13, 2013.

(51) Int. Cl.
| | |
|---|---|
| *E05B 17/10* | (2006.01) |
| *H01R 33/00* | (2006.01) |
| *F21S 9/02* | (2006.01) |
| *G06F 1/18* | (2006.01) |
| *E05B 1/00* | (2006.01) |

(52) U.S. Cl.
CPC .................. *F21S 9/02* (2013.01); *E05B 1/0084* (2013.01); *E05B 17/10* (2013.01); *G06F 1/181* (2013.01)

(58) Field of Classification Search
CPC .......... E05B 17/10; E05B 1/0084; F21S 9/02; F21V 33/0016; F21V 33/0028; F21V 33/006; F21W 2111/08; F21W 2131/107; E95B 1/0061
USPC .................................... 362/100; 16/414–415
See application file for complete search history.

(56) References Cited

U.S. PATENT DOCUMENTS

| | | | | |
|---|---|---|---|---|
| 893,214 | A | * | 7/1908 | Williams et al. .............. 362/100 |
| 970,698 | A | * | 9/1910 | Eyton ........................... 362/100 |
| 1,985,483 | A | * | 12/1934 | Clarke .......................... 362/100 |
| 2,676,244 | A | * | 4/1954 | Dittman ........................ 362/100 |
| 3,314,746 | A | * | 4/1967 | Millar ........................... 422/186 |
| 3,719,821 | A | * | 3/1973 | Foreman ....................... 362/100 |
| D297,107 | S | * | 8/1988 | Jones ............................ D8/322 |
| 5,701,635 | A | * | 12/1997 | Hawkes ......................... 16/421 |
| 5,713,615 | A | * | 2/1998 | Tsai .............................. 292/347 |
| 6,222,455 | B1 | * | 4/2001 | Kaiser ........................... 340/628 |
| 6,447,139 | B1 | * | 9/2002 | Wilkes .......................... 362/100 |
| 6,729,740 | B1 | * | 5/2004 | Gazard .......................... 362/100 |
| 6,997,394 | B1 | * | 2/2006 | Washington ................... 239/274 |
| 2003/0081401 | A1 | * | 5/2003 | Camarota et al. .............. 362/26 |
| 2004/0085755 | A1 | * | 5/2004 | Dupont ......................... 362/100 |
| 2005/0034270 | A1 | * | 2/2005 | Newman et al. .............. 16/110.1 |
| 2009/0122522 | A1 | * | 5/2009 | Yang ............................. 362/100 |

* cited by examiner

*Primary Examiner* — Jong-Suk (James) Lee
*Assistant Examiner* — Erin Kryukova
(74) *Attorney, Agent, or Firm* — Fox Rothschild LLP (57) ABSTRACT

A night-light comprising an elastic cover for mounting on a door handle and circuitry for activation and deactivation of a light source.

3 Claims, 8 Drawing Sheets

DOOR HANDLE NIGHT-LIGHT

This application claims the benefit of U.S. Provisional Application No. 61/764,291, filed on Feb. 13, 2013, and U.S. Provisional Application No. 61/858,094, filed on Jul. 24, 2103, each of which is incorporated herein by reference.

BACKGROUND

Door handles are used fundamentally as structures for opening and closing a door. Most often a door handle is interconnected with a latching mechanism that selectively connects a door to a door frame and keeps the door closed. When rotated, the door handle retracts the latching mechanism to allow the door to be freely opened.

Covers for door handles, such as that disclosed in U.S. Pat. No. 5,701,635, are known for use in preventing damage to an adjoining wall. Devices attached to or built into door handles are also known, such as that disclosed in U.S. Pat. No. 6,222,455, which comprises a smoke detector and signal light.

SUMMARY

There remains a need, however, for an improved door handle device which can provide light and other functionalities to a user, for example for use as a night-light, and which is economical to produce. The present door handle device meets such needs. In a preferred embodiment, the present device comprises an elastomeric cover which fits over an existing door handle and which contains electronic components to provide light and other functionalities. In one embodiment, when a user touches the device, a light is illuminated, and after a predetermined time (such as about 5 or 10 minutes), the light automatically turns off, although manual control is also possible. The device can also comprise a noise detector, and in this case is adapted to turn on the light in response to noise above a predetermined decibel level.

Alternatively or in addition, the device can include a smoke alarm and/or a $CO_2$ alarm which activates the light source of the device. In a further alternative embodiment, the device can include an audio system for playing a song or other audible sound, which can be activated by a user's touch or in response to noise, smoke or high $CO_2$ levels. The audible sound can be a recording made by an individual, such as by the parent of a child user. The audio system can also in some embodiments be included in place of a light source in the present device.

DESCRIPTION

Definitions

As used herein, the following terms and variations thereof have the meanings given below, unless a different meaning is clearly intended by the context in which such term is used.

"Circuit board" refers to a piece of material which supports and retains printed or integrated circuits and/or other electronic components. As used herein, the term circuit board refers both to the supporting structure and to the circuits and electronic components retained thereon, for example processing circuits.

"Door handle" refers to a mechanism attached to a door which allows a user to open or close the door by gripping the mechanism and applying force in a predetermined direction or manner. A door handle is generally rotated in a plane parallel to a vertical face of the door to which it is attached, and perpendicular to a floor or other support surface below the door, in order to move a latch portion of the mechanism inwardly into the door frame and thereby allow a closed door to be opened.

"Door knob" refers to a door handle shaped so that a user's hands can encompass the gripping portion of the mechanism. Door knobs are generally spheroid in shape, such as an oblate spheroid or prolate spheroid, though many configurations are possible.

"Door lever" refers to a door handle having a rigid bar or rod extending outwardly from a center portion of the door handle, generally in a plane parallel to the face of the door to which the handle is attached. The lever rotates around the center portion of the door handle in order to move a latch portion of the mechanism inwardly into the door frame and thereby allow a closed door to be opened.

"Elastomeric" refers to any material, such as natural or synthetic rubber, that is able to resume its original shape when a deforming force is removed.

"Horizontal" refers to an orientation approximately parallel to (i.e., not substantially extending toward or away from) a support surface, such as a floor.

"Inner," "inward" and "inwardly" mean in a direction or position located toward the horizontal or vertical center of a device or of a component part of the device, e.g. within the device.

"Lower" refers to the relative position of a component in the present device which is closer to or toward a support surface on or over which the present device is or can be positioned when in use.

"Night-light" refers to an electrical device which provides illumination, typically in the range of 10-200 lumens, and preferably between 15 and 50 lumens. The light of a night-light can be provided by a conventional light sources such as an incandescent bulb, an electroluminescent source, or a LED.

"Upper" refers to the relative position of a component in the present device which is further from or away from a support surface on or above which the present device is or can be positioned when in use.

"Upward" and "upwardly" mean away from a support surface on or above which the present device is or can be positioned when in use.

"Vertical" refers to an orientation extending toward or away from a support surface such as a floor, preferably perpendicularly with respect to the support surface.

The term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise.

Night-light Device

The present night-light device is a self-contained unit that mounts directly onto a door handle, such as a household doorknob. The night-light acts both as conventional night-light and as a signal light which, when activated, shows the location of a doorknob to the occupant of a room. The device generally comprises a cover for mounting the device and providing a gripping surface, and electronic components for providing various functionalities.

Cover

Figure 1:
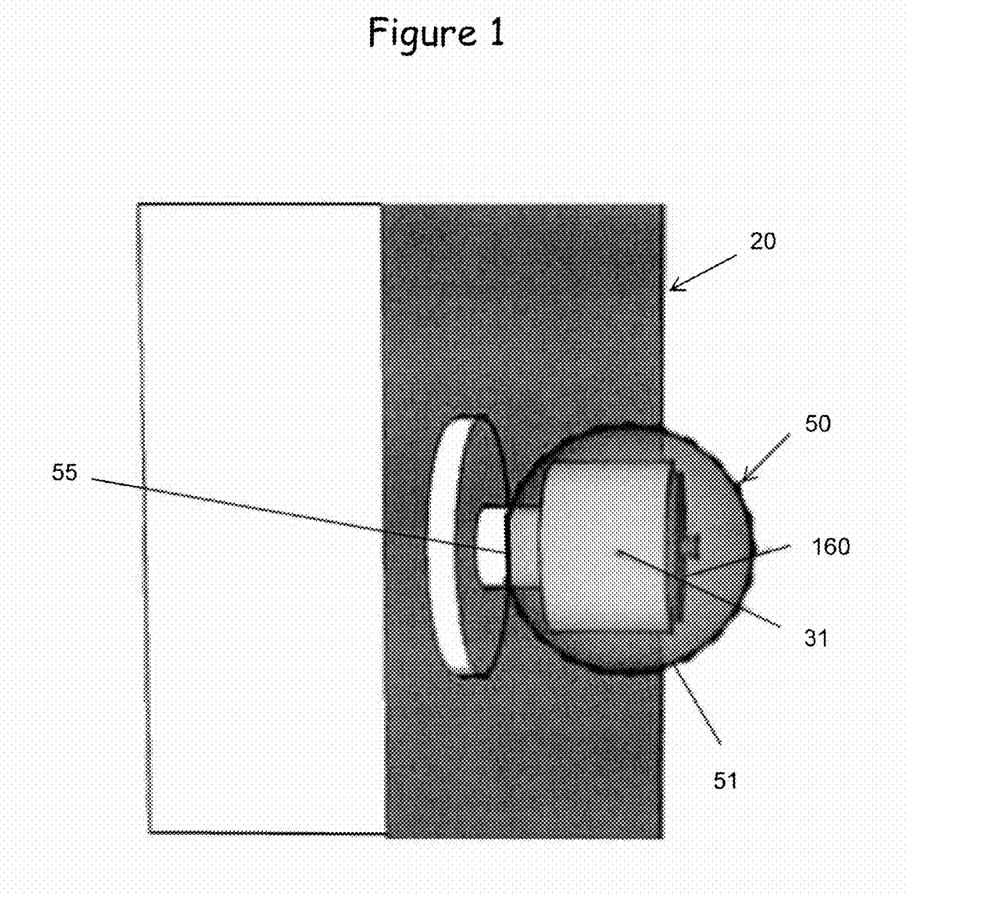
FIG. 1 is a perspective view of an embodiment of the present device mounted onto a door handle.
Figure 2:
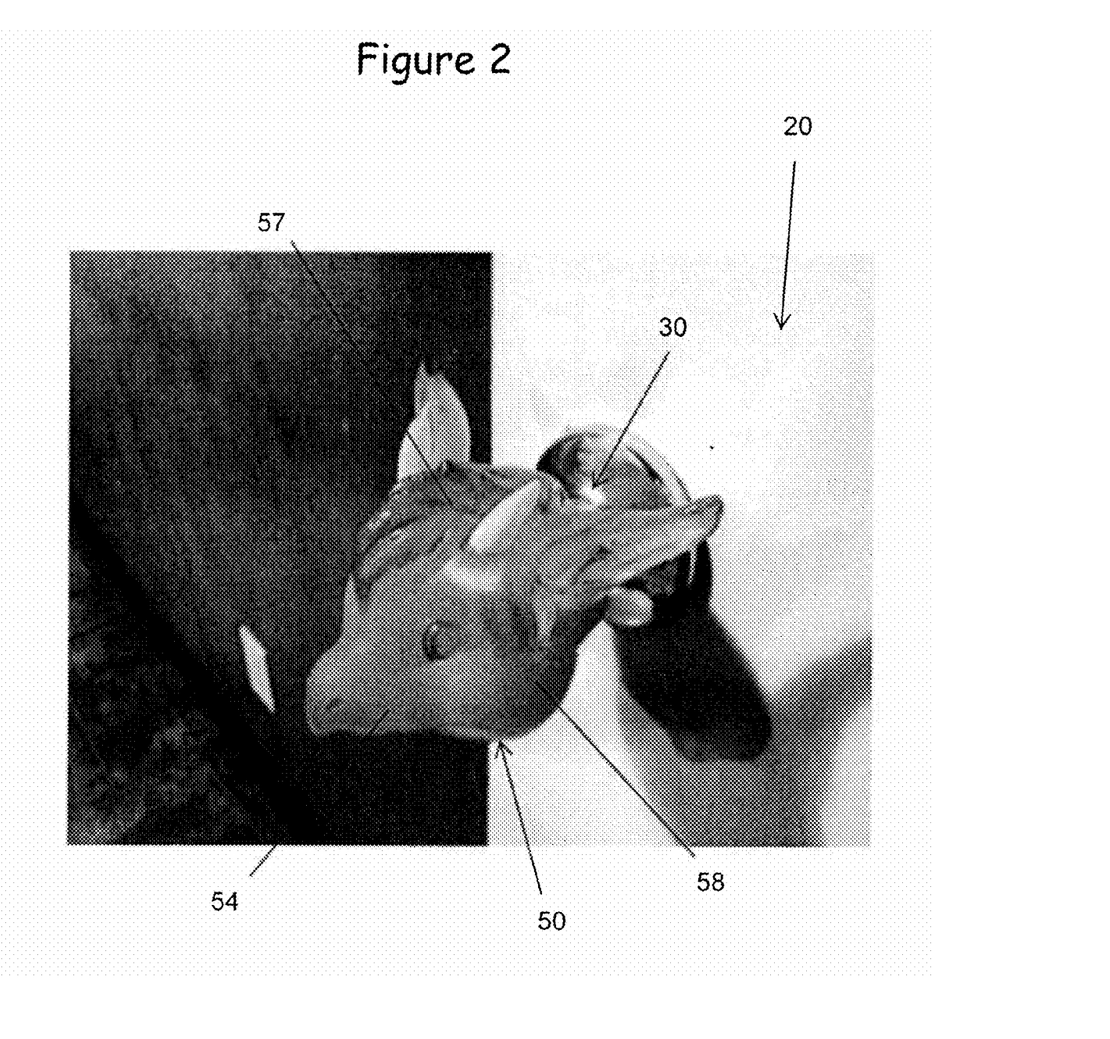
FIG. 2 is a photograph of another embodiment of the present device mounted onto a door knob.
Figure 3:
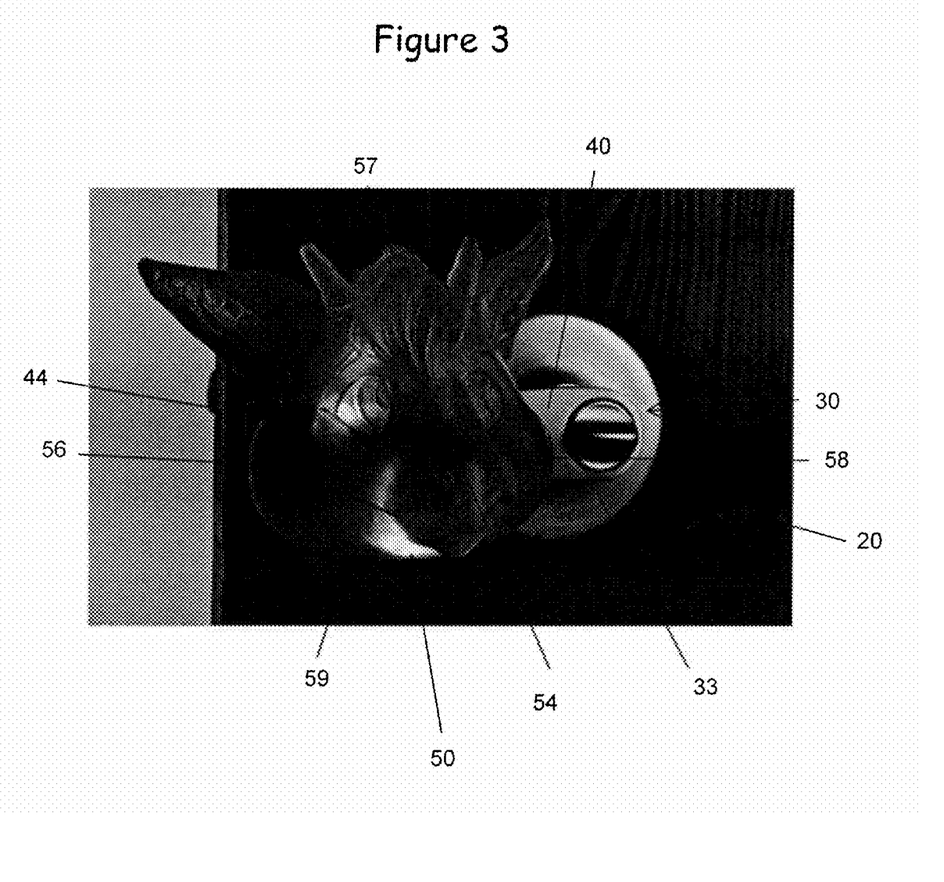
FIG. 3 is a photograph of a further embodiment of the present device mounted onto a door lever.

The present device 10 comprises an elastomeric cover 50 that is retained on a door handle 30, as shown in FIGS. 1-3. The elastomeric cover 50 has a proximal end 52, a distal end 54, a right lateral side 56, a left lateral side 58, an upper side 57, and a lower side 59. The outer surface 51 of the cover 50, in particular at the distal end 54, can be formed into any of a number of three-dimensional forms, such as that of a real or imaginary human or animal (see FIGS. 2-5), or into any other three dimensional object, and is preferably between about 5 and 8 centimeters in diameter (between about 2 inches and 3 inches). The form or appearance of the distal end 54 is preferably an image that imparts comfort to a child when the device 10 is used on a door in a child's room.

The proximal end 52 of the cover 50 preferably includes an opening 55 into a central receptacle. The inner surface of the receptacle is sized and shaped so as to be of smaller dimension than a door knob 31 or other door handle 30 to which the present device 10 is to be attached, so that when the inner surface of the receptacle is stretched and placed into contact with the door handle 30, it is able to grip the handle. The cover 50 in this embodiment also preferably covers any locking mechanism contained in the door knob, thereby preventing a child user of the device from inadvertently locking themselves into a room.

The material used to form the cover 50 also preferably has a sufficient coefficient of friction to adhere sufficiently to the door handle 30 so that when it is held by a user, the user can turn the door handle 30 in order to open and close the door 20 to which the handle is attached. The elastomeric cover 50 can be produced by methods known to the art, such as by injection molding, and can be made from rubber, silicone, or other suitably elastic materials, in particular polymer materials.

To attach the present device 10 to a door lever 33, a cover 50 such as that depicted in FIG. 3 is used. In this embodiment, the right lateral side 56 and left lateral side 57 each have openings which allow a door lever 33 to be placed through them. In one embodiment, the cover 50 comprises a solid piece of plastic material, and a passageway extends through the cover 50 from the right lateral side opening through to the left lateral side opening. The openings and passageway allow a door lever 33 to be placed therethrough. Alternatively, an embodiment of the present device 10 comprising a central receptacle suitable to retain a door knob can in addition be provided with a right lateral side opening extending from the outer surface 51 of the cover to the interior central receptacle and a left lateral side opening likewise extending from the outer surface 51 of the cover to the interior central receptacle. The left and right side lateral openings allow a door lever 33 to be placed therethrough, and allow the device 10 to be thereby retained on the door lever 33.

Electronic Components

Figure 8:
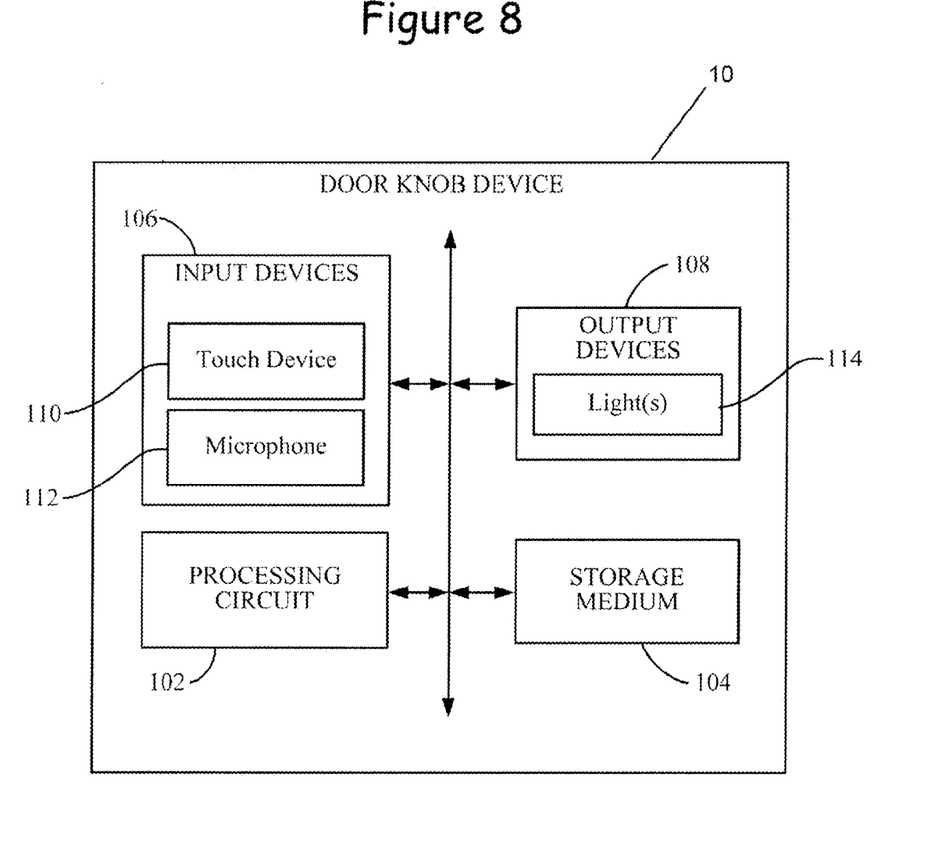
FIG. 8 is a diagram of the electronic components of the present device.

FIG. 8 is a block diagram illustrating select electronic components of an embodiment of the present device 10. The device 10 generally includes a processing circuit 102 coupled with a storage medium (memory) 104, one or more input devices 106, and one or more output devices 108.

The processing circuit 102 can be implemented as one or more of a processor, a controller, a plurality of processors and/or other structure configured to execute executable instructions including, for example, software and/or firmware instructions, and/or hardware circuitry. Examples of the processing circuit 102 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 102 are for illustration and other suitable configurations within the scope of the present disclosure are also contemplated.

The storage medium 104 may represent one or more devices for storing data, such as processor executable code or instructions (e.g., software, firmware), electronic data, databases, or other digital information. The storage medium 104 can be any available media that can be accessed by the processing circuit 102. By way of example and not limitation, the storage medium 104 may include a non-transitory computer-readable medium such as a magnetic storage device, a smart card, a flash memory device, random access memory (RAM), read only memory (ROM), programmable ROM (PROM), erasable PROM (EPROM), electrically erasable PROM (EEPROM), a register, and/or other non-transitory computer-readable mediums for storing information, as well as any combination thereof. In some examples, the storage medium 104 may be integral to the processing circuit 102.

The one or more input devices 106 generally include one or more devices adapted to input a digital or analog signal that may be employed by the processing circuit 102. In at least some examples, input devices 106 include one or more touch devices 110 and/or a microphone 112. A touch device 110 can include a touch sensitive switch or other device adapted to provide an input in response to being touched by a user. For example, the touch device 110 can include a pressure sensitive switch (e.g., push-button switch) adapted to input a signal to the processing circuit 102, which may cause the processing circuit 102 to power on/off one or more output devices 108. Alternatively, the touch device 110 can be a conductive sensor 130, which can be for example a capacitance touch switch, a resistance touch switch, or a piezo touch switch.

Other input devices 106 that can be used with the present device 10 include a microphone 112, which would includes an audio transducer adapted to generate electrical signals in response to audio input. Alternatively, the input devices can comprise a smoke detector, a $CO_2$ sensor, and/or a heat detector.

The one or more output devices 108 can include one or more light generating devices 114, such as one or more light emitting diodes (LEDs) 170. In some embodiments, the output device 108 includes a plurality of light generating devices 114, where at least some of the plurality of light generating devices 114 are adapted to emit different colors of light. Alternatively or in addition, the output device 108 can be a sound generator such as a loudspeaker.

The processing circuit 102 can also be adapted to perform any or all of the processes, functions, steps and/or routines described herein. As used herein, the term "adapted" in relation to the processing circuit 102 may refer to the processing circuit 102 being one or more of configured, employed, implemented, or programmed to perform a particular process, function, step and/or routine according to various features described herein.

In addition, the processing circuit 102 can be adapted to energize one or more output devices 108, such as light generating devices 114, in response to receiving an input from one or more input devices 106, such as a touch sensitive switch, an audible signal detector or a smoke detector. For example, the processing circuit 102 can be adapted to energize the one or more light generating devices 114 in response to an input signal received from one or more touch devices 110. In another example, the processing circuit 102 can be adapted to energize the one or more light generating devices 114 in response to a predetermined signal received from the microphone 112. For instance, the predetermined signal received from the microphone 112 may be a signal indicating a sound above a predetermined volume threshold and/or within a specified frequency range. By way of example and not limitation, the volume threshold may be defined as a volume above 75 dB.

In some examples, the processing circuit 102 can be adapted to energize the one or more light generating devices 114 for a predetermined period of time, for example, for 5 minutes, after which the lights are extinguished. In other examples, the processing circuit 102 can be adapted to energize the one or more light generating devices 114 until a subsequent signal is received from one or more input devices 106. The light generating devices 114 can alternatively or in addition be adapted to be energized in a predetermined order, intensity, and or time in order to produce a visual effect.

In preferred embodiments, the device 10 includes an audible signal detector, which activates when it detects sound over a predetermined decibel level or sound of a predetermined pitch or pitches. The audible signal detector in turn activates the light source, such as by displaying a red blinking light. The audible signal detector can, for example, activate the light source of the presence night-light when it detects sound of at least 75 dB, more preferably of at least 80 dB, and even more preferably of at least 85 dB. The audible signal detector is preferably adapted to activate in response to a signal generated by a smoke detector or carbon dioxide detector. Optionally, a sound responsive transducer or smoke responsive transducer can be included in the present device.

Circuit Assembly

Figure 5:
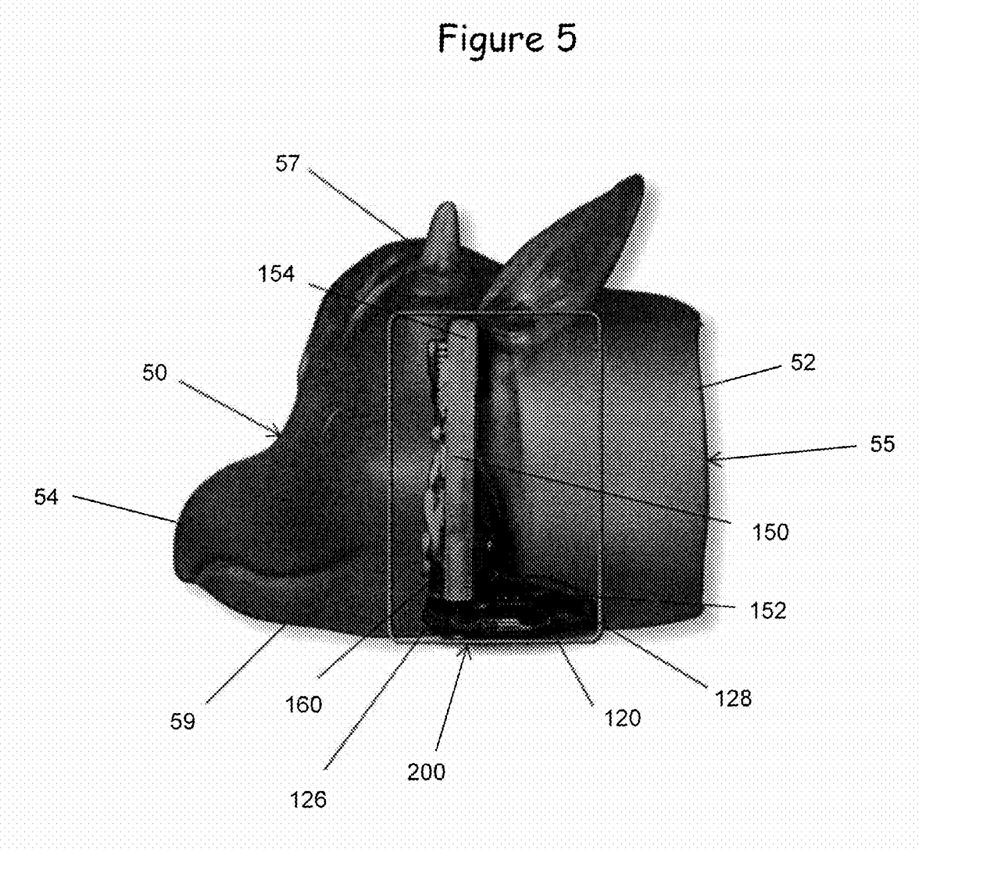
FIG. 5 is a side elevation view of the device of FIG. 4 illustrating the placement of the electronic components of the device within the cover portion.
Figure 6:
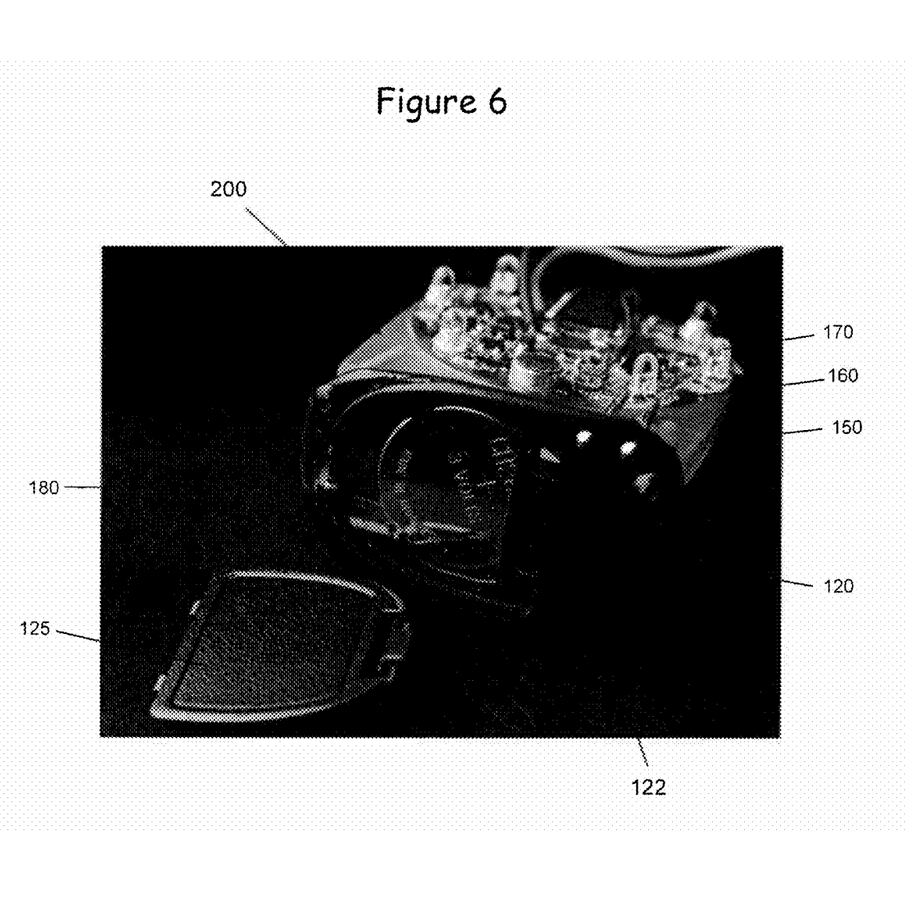
FIG. 6 is a front elevation view of the electronic components of the device of FIGS. 4 and 5.
Figure 7:
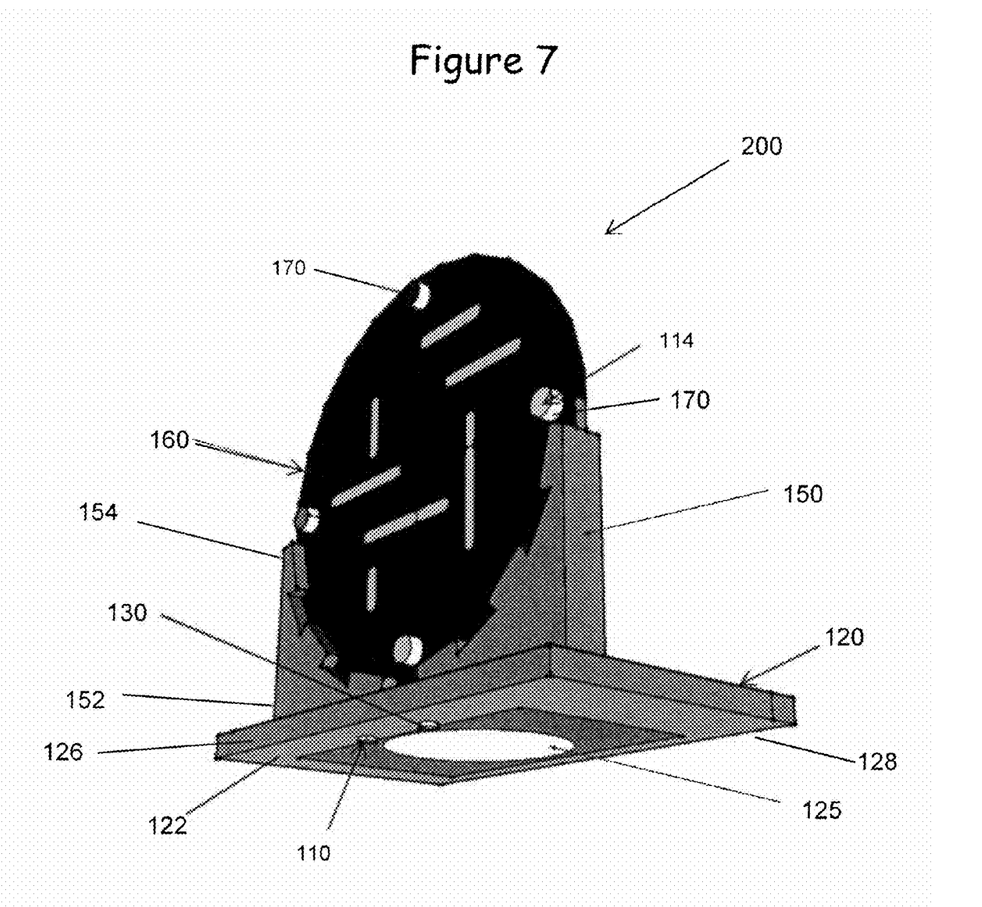
FIG. 7 is a perspective view of an alternative embodiment of the electronic components of the present device.

The electronic components of the present device 10 are preferably incorporated into a circuit assembly 200, best seen in FIGS. 6 and 7. The circuit assembly 200 is generally composed of a base 120, a circuit board housing 150, and a circuit board 160. The circuit board housing 150 retains the circuit board 160 and provides mechanical support to the circuit board 160. The housing 150 can partially circumscribe or enclose the circuit board 160, as shown in FIG. 7, but in a preferred embodiment shown in FIGS. 4-6, the housing 150 encloses the periphery of the circuit board 160. In alternative embodiments, the housing 150 can enclose or encase the circuit board 160 for greater protection of the electronic components of the present device 10. The housing 150 has a proximal end 152 and a distal end 154.

At its proximal end 152, the housing 150 is attached to a base 120 having an outer surface 122 and an inner surface 124. The base 120 extends away from the housing 150, preferably in a perpendicular manner. In the embodiments shown in FIGS. 6 and 7, a distal end 128 of the base extends further from the housing 150 than a proximal end 126 of the base 120. The base 120 preferably further includes a chamber enclosing a battery 180 for powering the electronic components of the device 10. Preferably, the battery is a coin battery and is operable to power the light source of the presence of the device for at least 20 hours (if activated continuously). The battery preferably lasts for at least 2 to 3 months in use, and can be replaced by opening a battery housing door 125 located on the outer surface 122 of the base 120.

Figure 4:
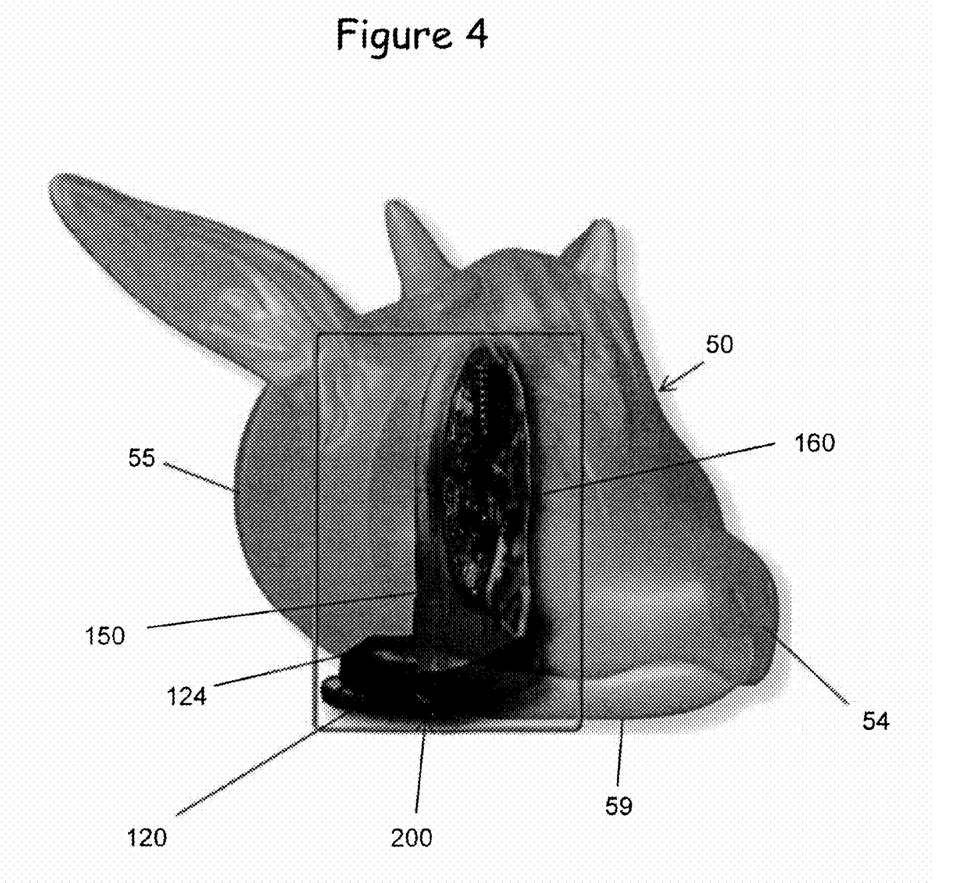
FIG. 4 is a perspective view of an embodiment of the present device illustrating the placement of the electronic components of the device within the cover portion.

As seen in FIGS. 1, 4, and 5, the circuit assembly 200 is preferably embedded within the elastomeric material of the cover 50 when the present device is fully assembled. In a preferred construction, the circuit board 160 and housing 150 are retained in a slot or receptacle of the cover 50. The slot or receptacle has an opening in the outer surface 51, preferably in the lower side 59 of the cover 50 as shown in FIGS. 4 and 5, and more preferably in a central portion of the lower surface of the lower side 59. In this embodiment, the circuit board 160 and housing 150 extend inwardly from the lower side 59 of the elastomeric cover 50. By encasing the circuit board 160 and housing 150 within the cover 50 in this way, these components are surrounded by elastomeric material and thereby protected.

The circuit board 160 and housing 150 are also preferably retained within the material of the cover 50 in an approximately vertical manner, i.e. approximately perpendicular to the surface of the lower side 59 of the cover 50, such that one face of the circuit board 160 and housing 150 are approximately parallel to the face of the door 20 to which the present device 10 is attached. This facilitates manufacture of the present device 50 while also placing the electronic components within the material of the cover 50 and protecting them.

In this embodiment, the inner surface 124 of the base 120 is covered by the cover 50, while the outer surface 122 of the base preferably faces the exterior of the device 10. In the illustrated embodiments, the outer surface 122 of the base is on the lower side 59 of the cover 50 and faces downwardly. When a conductive sensor 130 is used as the activation switch for an output device such as an LED 170, the sensor 130 can be placed on the outer surface 122 of the base 120. In this way, the switch is easily accessible, but the handle 30 can also be actuated without activating electronic components of the present device 10.

In an alternative embodiment, shown in FIG. 1, an output device such as a light source is pressure activated, such as through the application of hand pressure to an outer surface 51 of the cover 50. In the illustrated embodiment, the pressure activated switch is encased within the material of the cover 50. A pressure activated switch can be placed on or in electrical connection with the circuit board 160.

Method of Operation

In use, the present device 10 can be attached to a door knob 31 by placing the opening 55 adjacent to the door knob 31 and then urging the proximal end 52 of the cover 50 toward the door knob 31 so as to stretch the material of the cover 50 around the opening 55 until it passes around and encompasses the gripping portion of the door knob 31. Due to the elasticity of the cover 50, the receiving chamber on the interior of the cover 50 contacts the outer surface of the door knob 31 and grips it with a friction fit.

To attach the present device 10 to a door lever 33, a cover 50 such as that depicted in FIG. 3 is used. In this embodiment, the distal end 44 of the projecting handle portion 40 is first placed through an opening in the left lateral side 58, after which the device is urged proximally toward the proximal end 42 of the handle portion 40 until the distal end 44 passes through an opening in the right lateral side 58.

In order to activate the light source of the device 10, if the activation switch is a pressure sensitive switch, a user can push on the device while it is mounted on a door handle in order to activate the light source. In a preferred embodiment, pushing the switch subsequent times changes the light color and/or patterns. After a set time, such as after about 5 minutes or 10 minutes, the light preferably deactivates in order to conserve battery time, though a longer activation period can be set if more time is needed for the device to operate as a night-light and allow a child, for example, to fall asleep. If a conductive sensor is used for light activation, the light source can be activated by simply touching the switch.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure.

Recitation of value ranges herein is merely intended to serve as a shorthand method for referring individually to each separate value falling within the range. Unless otherwise indicated herein, each individual value is incorporated into the specification as if it were individually recited herein. All references cited herein are incorporated by reference in their entirety.

What is claimed is:

1. A device adapted to be mounted to a door handle, comprising:
    an elastomeric cover having a proximal end, a distal end, an upper end, and a lower end, wherein the proximal end is adapted to be retained on a door handle;
    a circuit assembly comprising:
        a circuit board, the circuit board comprising one or more input devices, one or more output devices, memory, and a processing circuit;
        a housing for the circuit board, the housing having a proximal end and a distal end;
        a base at the proximal end of the housing having an outer surface and an inner surface, the base extending away from the housing, the base including a battery housing and an activation switch for at least one of the one or more output devices,
    wherein the circuit board and housing extend inwardly from the lower end of the elastomeric cover and are surrounded by the cover, and wherein the outer surface of the base is on the exterior of the device so that the activation switch is accessible.

2. The device of claim 1, wherein the device is adapted to be mounted to a door knob, further comprising a hollow central receptacle in the cover, the central receptacle having an opening in the proximal end of the cover.

3. The device of claim 1, wherein the one or more output devices include an LED light.

* * * * *